United States Patent [19]
Pesola et al.

[11] Patent Number: 6,014,551
[45] Date of Patent: Jan. 11, 2000

[54] ARRANGEMENT FOR TRANSMITTING AND RECEIVING RADIO FREQUENCY SIGNAL AT TWO FREQUENCY BANDS

[75] Inventors: Mikko Pesola, Märynummi; Kari T. Lehtinen, Salo, both of Finland

[73] Assignee: Nokia Mobile Phones Ltd., Espoo, Finland

[21] Appl. No.: 08/893,952

[22] Filed: Jul. 16, 1997

[30]     Foreign Application Priority Data

Jul. 18, 1996  [FI]  Finland ..................................... 962895

[51] Int. Cl.[7] ............................... H04B 1/40; H04B 1/44
[52] U.S. Cl. ...................... 455/86; 455/33.2; 455/56.1; 455/59; 455/267; 455/82; 455/83; 455/86
[58] Field of Search ...................... 455/552, 553, 455/575, 82, 83, 84, 78, 219; 375/260, 295, 296, 219, 275, 267, 347, 356

[56]           References Cited

U.S. PATENT DOCUMENTS

| | | | |
|---|---|---|---|
| 5,091,919 | 2/1992 | Kuisma | 375/60 |
| 5,123,031 | 6/1992 | Kuisma | 375/60 |
| 5,590,412 | 12/1996 | Sawai et al. | 455/82 |
| 5,758,266 | 5/1998 | Kornfeld | 455/86 |

FOREIGN PATENT DOCUMENTS

| | | |
|---|---|---|
| 0678974 A2 | 10/1995 | European Pat. Off. . |
| 501 717 A2 | 2/1992 | Japan ........................................ 455/84 |
| 2 278 253 | 11/1994 | United Kingdom ..................... 455/84 |
| WO 92/00634 | 1/1992 | WIPO .................................... 455/83 |

*Primary Examiner*—David R. Hudspeth
*Assistant Examiner*—Meless Zewdu
*Attorney, Agent, or Firm*—Perman & Green, LLP

[57]           ABSTRACT

The present invention relates to an arrangement for transmitting a radio-frequency signal at two different frequency bands and for receiving at two different frequency bands. The arrangement can be applied for instance to a transceiver of a radio communications system operating at two different frequency bands, or to a transceiver meant to be used in connection with two different radio communications systems. One of the ideas of the invention is that one and the same filter (72), belonging to the RF front end of the antenna circuit, is used for filtering interference from at least two signals located at different frequency bands, in which case the number of filters (72, 75) can be reduced. By means of the solution suggested in the invention, also the number of controllable switches (73) provided on the signal path of the RF front end can be minimized.

12 Claims, 4 Drawing Sheets

ARRANGEMENT FOR TRANSMITTING AND RECEIVING RADIO FREQUENCY SIGNAL AT TWO FREQUENCY BANDS

BACKGROUND OF THE INVENTION

The present invention relates to an arrangement for transmitting radio frequency signal, i.e. RF signal, at two different transmitting frequency bands and for receiving at two different reception frequency bands. The arrangement is applicable, among others, in a transceiver of a radio communications system operating at two frequency bands or in a transceiver meant to be used in connection with two radio communications systems.

Mobile communications systems develop and grow rapidly, wherefore in many areas, there have been built or are being built systems according to several different standards. Consequently a need has arisen for such mobile stations that can be used in more than one system. Moreover, there are being developed new, so-called third-generation systems that will probably require dual mode operation of the receiver. Among these systems, let us point out the UMTS (Universal Mobile Telecommunications System) defined by the ETSI (European Telecommunications Standards Institute) and the FPLMTS (Future Public Land Mobile Telecommunications Systems) defined by the Radio Sector of the International Telecommunication Union.

FIG. 1 is a block diagram of the radio frequency parts, i.e. RF parts, of a prior art multi-mode mobile telephone operating at two different frequency bands. This type of arrangement is described in the patent application [1] EP 678,974 A2. The system includes a separate RF front end for both frequency bands as well as for the receiver and the transmitter respectively; in the receiver part, this RF front end comprises a pre-amplifier 2, 27 and an RF filter 3, 28, and in the transmitter part filters 19, 23 and a power amplifier 18, 24 as well as duplex filters 1, 25 for both frequency bands.

In order to be able to use the respective RF parts at each frequency band, two-way switches 26, 29, 31 are provided in the antenna front end and at the antenna-side ports of the mixers of the receiver and transmitter. While operating at two different frequency bands, two duplex filters 1, 25, two pre-amplifiers 2, 27 and two RF filters 3, 28 are employed in the signal reception. Respectively, in signal transmission, there are used two RF filters 19, 23 of the transmitter, two power amplifiers 18, 24 and two duplex filters 1, 25. By means of the two-way switches 26, 29, 31, one of the two blocks of the same type are always in use. In order to create two different first mixer frequencies LO1, in the synthesiser S1 there are provided two voltage controlled oscillators 13, 30, one of which is switched to be active by the controls V1 and V2, depending on the respective frequency band of operation, for instance the frequency band of the GSM or the PCN system. The employed controls VI and V2 can be the oscillator operating voltages (i.e. one is switched to operating voltage, the other is not). Each oscillator 13, 30 gives a different output frequency. Instead of different oscillators, in the formation of different mixer frequencies LO1 it could be possible to use two different frequency synthesizers S1, one of which is always selected to use, depending on the frequency band in question. Yet another alternative is to use one synthesiser S1, the phase-locked loop 15 whereof includes two different frequency dividers, one of which is always eligible for use. The division number of the divider 22 is chosen by the control NX. The division number for the PCN system is 2 and for the GSM system 1.

From the mixer 4, the signal first passes through a first intermediate frequency filter 5 to a second mixer 6, where it is mixed with the second mixer frequency LO2 in order to create a second intermediate frequency IF2. From the second mixer 6, the signal passes through a second intermediate frequency filter 8 and through +45° and −45° phase transfer blocks 10 and 11 to a demodulator 12, advantageously to an I/Q demodulator, where the local oscillator frequency LO3 also is brought.

In respective fashion, in the transmitter the signal I-TX, Q-TX entering a modulator in order to be transmitted is taken from the modulator 21, advantageously an I/Q modulator—where in addition to the signal to be transmitted, there also is brought as the modulator carrier wave signal, the frequency of the second mixer frequency LO2 divided by the divider 22—into a mixer 20; in said mixer 20, the signal is mixed to transmitting frequency FTX with the first mixer frequency LO1. From the mixer 20, the signal is brought through a transmitter-frequency RF filter 19 to a power amplifier 18, wherefrom the amplified signal is brought via the duplex filter 1 to the antenna ANT.

In the description the GSM and PCN systems are as examples: the operating frequencies used in said systems are as follows:

| | | |
|---|---|---|
| GSM: | reception: | 935.2 ... 959.8 MHz |
| | transmission: | 890 ... 915 MHz |
| | mixer frequency LO1: | 1215.6 ... 1240.2 MHz (RX) |
| | | 1222.6 ... 1247.2 MHz (TX) |
| | mixer frequency LO2: | 332.4 MHz |
| | frequency LO3: | 26 MHz |
| PCN: | reception: | 1805.2 ... 1879.8 MHz |
| | transmission: | 1710.2 ... 1784.8 MHz |
| | mixer frequency LO1: | 1524.8 ... 1599.4 MHz (RX) |
| | | 1544.0 ... 1618.6 MHz (TX) |
| | mixer frequency LO2: | 332.4 MHz |
| | local oscillator frequency LO3 of the demodulator: | 26 MHz |

A drawback of the prior art solution according to FIG. 1 is that for its RF interface, there is needed a remarkable number of filters (1, 3, 19, 23, 25, 28) and controllable switches (26, 29, 31) on the signal path, which makes the RF front end complicated and increases production expenses. Moreover, the switches cause attenuation on the signal path in the conducting mode, and "leak", i.e. pass signals also in the open state.

SUMMARY OF THE INVENTION

The object of the present invention is to create an arrangement whereby the above described drawbacks of the prior art can be avoided.

One of the ideas of the invention is that one and the same filter belonging to the RF front end is used for filtering interference from two different signals, in which case the number of filters can be reduced. By means of the solution according to the invention, the number of controllable switches required on the signal path of the RF front end can likewise be minimised. Moreover, it is possible to use only one low-noise amplifier for both reception frequency bands in the receiver part, and only one RF power amplifier for both transmitting frequency bands in the transmitter part.

In the prior art it is known to use a synchronised switch in a telephone of a time division system, so that in the receiving mode, the switch directs the signal from the antenna to the receiver and blocks the signal path from the transmitter to the antenna. In the transmitting mode the switch leads the signal from the transmitter to the antenna and blocks the signal path from the antenna to the receiver.

Apart from the filter arrangements, a main idea of the present invention is that one and the same synchronised switch can be used, in addition to time divided transmission and reception selection, also in the selection of the frequency band in multi-mode mobile telephones or in the so-called third-generation systems that apply dual mode operation. Thus the need for additional switches can be avoided.

The system according to the invention for transmitting and receiving RF signal, in which transmitting can take place in the first and in the second transmitter frequency band, said first and second transmitter frequency bands being separate, and where the reception can take place at the first and at the second receiver frequency band, said first and second receiver frequency bands being separate, while the arrangement comprises filtering means for filtering the received and transmitted signal, is characterised in that at least one filtering means is used for filtering signals in at least two different frequency bands.

The preferred embodiments of the invention are introduced in the dependent claims.

BRIEF DESCRIPTION OF THE DRAWING

The invention is explained in more detail below, with reference to the appended drawings, where.

DETAILED DESCRIPTION OF THE INVENTION

Figure 1:
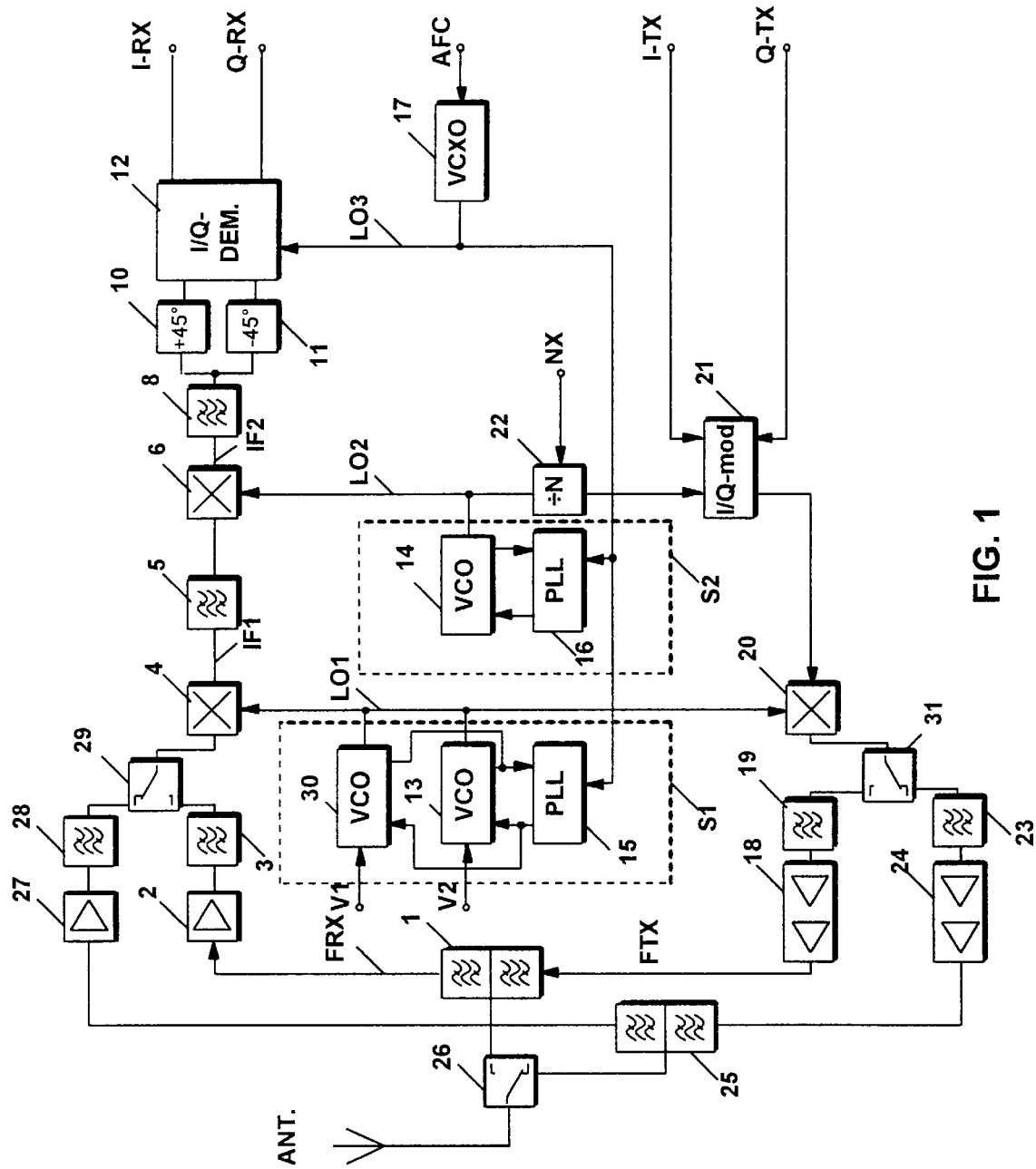
FIG. 1 is a block diagram illustrating the RF elements of a prior art mobile telephone operating at two different frequency bands.

FIG. 1 was already explained in the description of the prior art above. In the description below, we shall explain the alternative embodiments of the RF front end according to the invention with reference to FIGS. 2–11. The embodiments according to the invention are described only as regards the RF front end; other RF elements of the transceiver can be realised as known in the prior art, for example by using the arrangement illustrated in FIG. 1.

In the description and claims below, the signal received at the first receiver frequency band or band will be called the first signal, the signal received at the second receiver frequency band will be called the second signal, the signal to be transmitted at the first transmitter frequency band will be called the third signal and the signal to be transmitted at the second transmitter frequency band will be called the fourth signal. Said terms will be used irrespective of the location of said signals in the transmission or reception chain.

Figure 2:
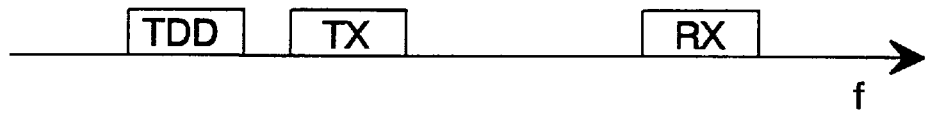
FIG. 2 illustrates the frequency bands used in a communication arrangement.

FIG. 2 illustrates frequency bands used by a communication system on a frequency axis f, where the frequency is illustrated as growing from left to right. For the first communication procedure, there are reserved separate frequency bands TX for transmission and RX for reception, and for the second communication procedure, there is reserved the frequency band TDD which is used for both transmission and reception. This type of communication system can be for instance UNITS. In the communication arrangement illustrated in FIG. 2, the distance of the first transmission frequency (TX) from the second transmission frequency band (TDD) and from the second reception frequency band (TDD) is shorter than from the first reception frequency band (RX).

In a transceiver used in the communication arrangement illustrated in FIG. 2, the transmitter needs RF signal filtering for eliminating false signals, particularly harmonics of the transmitter frequency but possibly also other frequencies. In the reception, filtering is needed for preventing signals external to the band from saturating the receiver. In that case filtering attenuation is particularly needed at image frequency.

Figure 3:
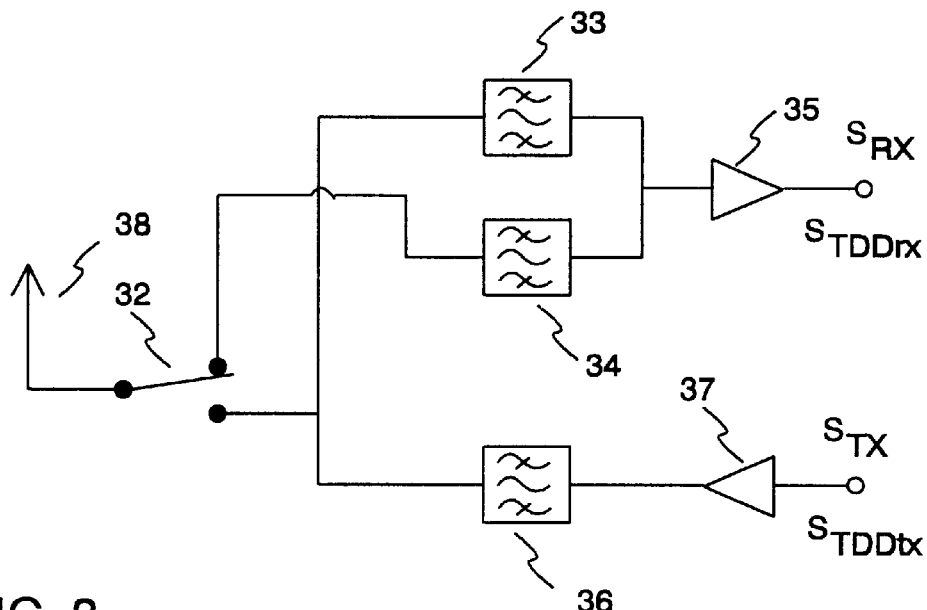
FIG. 3 illustrates an RF front end according to the invention, suited to be used in the communication arrangement of FIG. 2.

FIG. 3 illustrates an RF front end according to the invention, suited for the communication system of FIG. 2. There the RF signal received by the antenna 38 is directed to the switch 32. The switch 32 is controlled so that when receiving at the RX frequency band, the signal is directed to the band pass filter 33, the pass band whereof is set at band RX. After the filter, the signal is amplified in the amplifier 35, from the output whereof there is obtained the signal $S_{RX}$ obtained from the RX band.

While receiving a signal at the TDD band, the received RF signal is directed, by the switch 32, to a band pass filter 34, the pass band whereof is set at the TDD band. Thereafter the filtered signal is amplified in an amplifier 35, from the output whereof there is received the signal $S_{TDDrx}$ for further processing.

In the transmitter mode, the signal $S_{TX}$ and $S_{TDDtx}$ to be transmitted are amplified in an amplifier 37 and filtered in a band pass filter 36. The pass band of the filter 36 is designed so that both the TX band and the TDD band are located at the pass band of the filter 36. The amplified and filtered signal is then directed to the switch 32, which in the transmitter mode is set to a state where the signal to be transmitted is switched to the antenna 38.

Consequently, in the solution according to FIG. 3, there is used in the transmission one filter 36, the pass band whereof covers both transmission bands TX and TDD. This is possible when the distance between said transmission bands is short. Yet another prerequisite is that the transmitter has a low noise level and that interference signals are located outside said bands. In addition to the small number of filters, another advantage of the invention is that a switch is not needed in between the transmitter and the filter.

In addition, in the reception the switch there can be eliminated between the filters 33 and 34 and the amplifier 35, if the filter outputs are connected in parallel. In order to prevent both of the filters in parallel connection from attenuating the pass band signals of the other filter, the impedances of both filters must be high at the pass band of the other filter. Thus the transfer of the signal power to the other filter is avoided. If the pass bands of the filters overlap, the parallel connection of the outputs increases the attenuation, because a typical impedance at the pass band is 50 ohm, and in that case part of the signal power is transferred to another filter.

Figure 4:
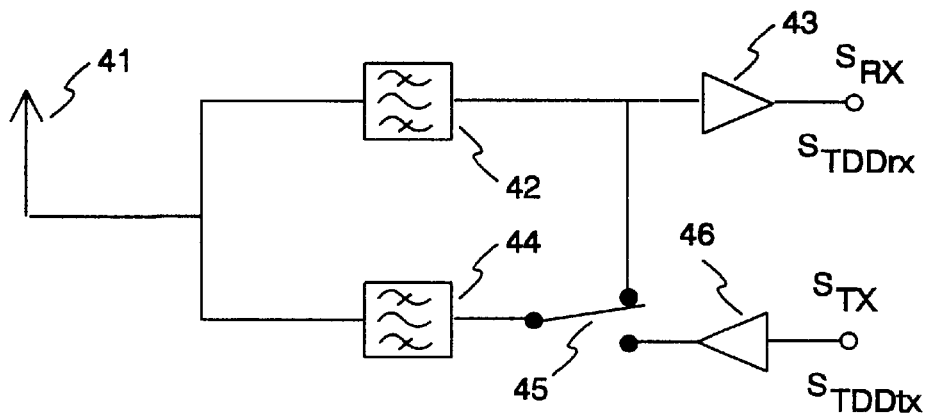
FIG. 4 illustrates another RF front end according to the invention, suited to be used in the communication arrangement of FIG. 2.

FIG. 4 illustrates another RF front end arrangement according to the invention, suited to be used in the communication system of FIG. 2. There the signal received by the antenna 41 is brought to a band pass filter 42 and to a band pass filter 44. The pass band of the filter 42 is set so that the RX band is located at the pass band of the filter. When a signal is received at the RX band, the received signal is thus switched, via the filter 42, to the amplifier 43, from the output whereof there is obtained an amplified, received signal $S_{RX}$.

The pass band of the filter 44 is designed so that both the TDD band and the TX band are located at the pass band of the filter 44. While receiving a signal at the TDD band, the signal received by the antenna 41 thus proceeds through the filter 44, and the filtered signal is directed, by a switch 45, further to the amplifier 43. From the amplifier output, there is obtained a signal $S_{TDDrx}$ for further processing.

While transmitting a signal at the TX or TDD band, the signal $S_{TX}$ or $S_{TDDtx}$ is directed to an amplifier 46, and the amplified signal obtained from the output thereof is directed, by the switch 45, to the band pass filter 44. As was already maintained, the filter 44 passes both the TDD and the TX band. The filtered transmission signal is further switched to the antenna 41.

By means of the solution illustrated in FIG. 4, there are achieved the same advantages as by means of the solution illustrated in FIG. 3. Moreover, in the arrangement of FIG. 4, only two filters are employed, because transmission uses the same TDD band filter as the reception.

Figure 5:
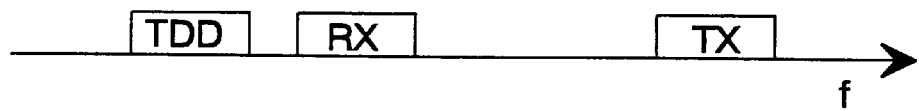
FIG. 5 illustrates frequency bands used in another communication arrangement.

FIG. 5 illustrates the frequency bands used by a communication system on the frequency axis f. For the first communication procedure, there are reserved separate frequency bands, the transmitter frequency band TX and the receiver frequency band RX, and for the second communication procedure, there is reserved the frequency band TDD, which is used in both reception and transmission. The employed frequency bands are located on the frequency axis so that the TDD band and the RX band are located near to each other, and the TX band is located further away of said bands. The communication system illustrated in FIG. 5 can be for instance a UMTS system. While employing the communication arrangement illustrated in FIG. 5, similar filtering operations are assumed of the transceiver as was explained above, in the description of FIG. 2.

Figure 6:
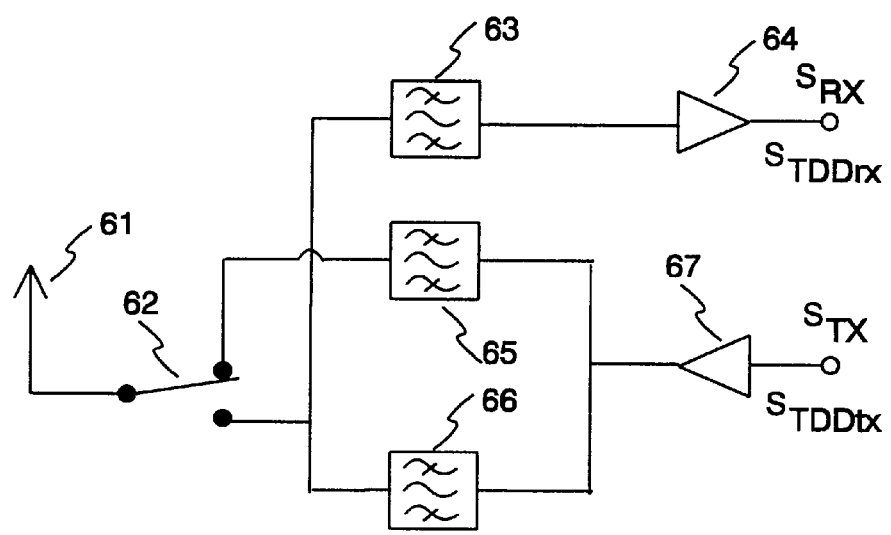
FIG. 6 illustrates an RF front end according to the invention, suited to be used in the communication arrangement of FIG. 5.

FIG. 6 illustrates an RF front end system according to the invention, suited to be used in a communication arrangement of FIG. 5. The signal received by the antenna 61 is there directed, by a switch 62, to a band pass filter 63. The pass band of the filter 63 is designed so that both the TDD band and the RX band are located at the pass band of the filter 63. The filtered signal is amplified in an amplifier 64, from the output whereof there are obtained the received, amplified signals $S_{RX}$ and $S_{TDDrx}$.

In the transmitter mode, the signal $S_{TX}$ or $S_{TDDtx}$ is amplified in an amplifier 67, whereafter the signal is directed to band pass filters 65 and 66. The pass band of the filter 65 is designed so that the filter passes the TDD band, and consequently while transmitting at the TDD band, the transmitter signal filtered by the filter 65 is directed, by the switch 62, to the antenna 61. As for the pass band of the filter 66, it is designed so that the filter passes the TX band; consequently, while transmitting at the TX band, the transmitter signal filtered by the filter 66 is directed, by the switch 62, to the antenna 61. By applying the solution according to FIG. 6, there are achieved the same advantages as with the solution according to FIG. 3.

Figure 7:
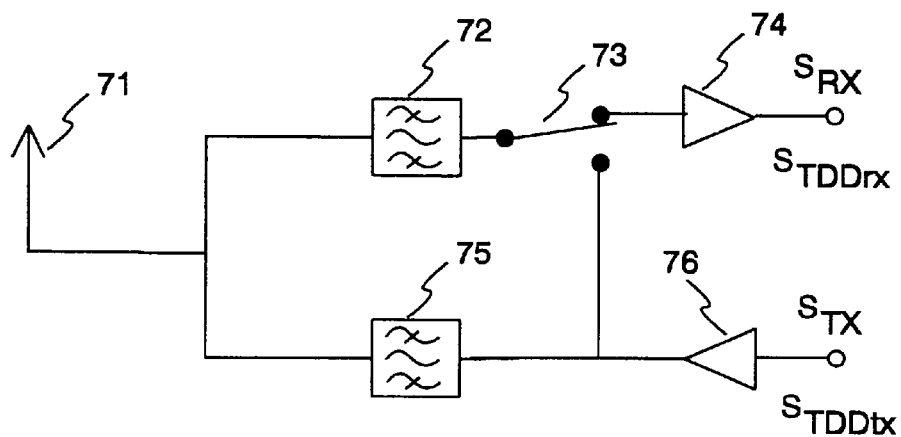
FIG. 7 illustrates another RF front end according to the invention, suited to be used in the communication arrangement of FIG. 5.

FIG. 7 illustrates another RF front end arrangement according to the invention, suited to be used in a communication system of FIG. 5. There the signal received by the antenna 71 is switched to a band pass filter 72. The pass band of the filter 72 is designed so that both the TD band and the RX band are located at the pass band of the filter 72. The filtered, received signal is directed, by a switch 73, to an amplifier 74. From the amplifier output, there are obtained the amplified received signals $S_{RX}$ and $S_{TDDrx}$.

In transmission, the RF signal $S_{RX}$ or $S_{TDDtx}$ to be transmitted is fed into the amplifier 76, the output whereof is coupled to a band pass filter 75. The pass band of the filter 75 is designed so that the TX band is located at the pass band of the filter 75, and thus while transmitting at the TX band, the transmitter signal is directed, via the filter 75, to the antenna 71. While transmitting at the TDD band, the transmitter signal is directed, via the switch 73, to the filter 72. As was already stated, the TDD band is located at the pass band of the filter 72, and consequently the transmitter signal is switched to the antenna 71 via the filter 72. The solution according to FIG. 7 has the same advantages and drawbacks as the solution according to FIG. 4.

Figure 8:
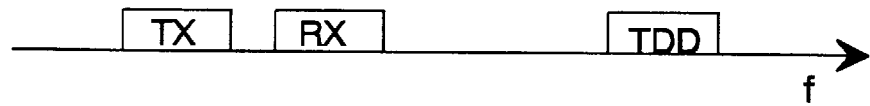
FIG. 8 illustrates frequency bands used in a third communication arrangement.

FIG. 8 illustrates the use of frequency bands in a third communication arrangement. It comprises the receiver band RX and the transmitter band TX, connected to the first system. In the second system both transmission and reception take place at the TDD band. In the arrangement according to FIG. 8, the distance between the RX and TX bands is shorter than the distance of the TDD band from the RX and TX bands. The first system can be for instance a GSM system, and the second system can be for instance a DECT, PCS or AMPS system.

Figure 9:
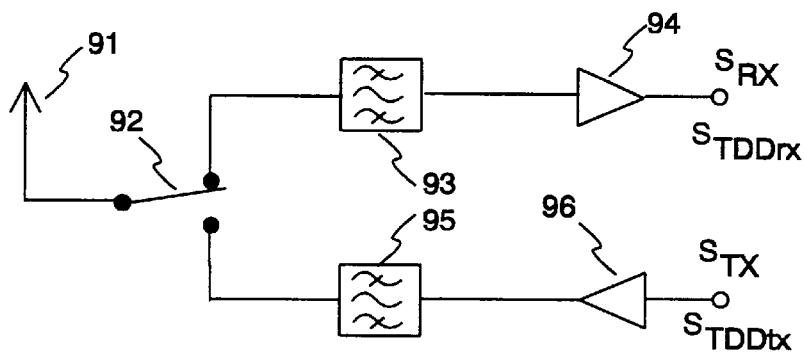
FIG. 9 illustrates an RF front end according to the invention, suited to be used in the communication arrangement of FIG. 8.

FIG. 9 illustrates an RF front end system according to the invention, suited to be used in a communication arrangement of FIG. 8. The signal received by the antenna 91 is there directed by a switch 92 to a filter 93. The pass band of the filter 93 is designed so that both the RX band and the TDD band are located at the pass band of the filter 93. Advantageously the filter 93 should have attenuation both at the TX band and in between the RX and TDD bands. One alternative is to realise the reception filtering with two separate, parallelly connected band pass filters, so that the TDD band is located at the pass band of the first filter and the RX band is located at the pass band of the second filter. It is advantageous to use two parallelly connected filters if a high blocking attenuation is required in between the two bands to be passed by. The filtered signal is further directed to an amplifier 94, from the output whereof there is obtained a received, amplified RX band signal $S_{RX}$ and TDD band signal $S_{TDDrx}$.

In transmission, the TX band signal $S_{TX}$ or the TDD band signal $S_{TDDtx}$ is fed into an RF power amplifier 96 and the amplified signal is further directed to a band pass filter 95. The pass band of the filter 95 is designed so that both the TX band and the TDD band are located at the pass band of the filter 95. If the transmitter spectrum is clean, the attenuation requirements of the stop band of the filter 95 are easily met. The filtered signal is further directed by the switch 92, to the antenna 91.

Figure 10:
FIG. 10 illustrates frequency bands used in a fourth communication arrangement.

FIG. 10 illustrates the use of frequency bands in a fourth communication arrangement. It comprises a receiver band RX1 and transmitter band TX1 connected to the first system. In the second system reception takes place at the receiver band RX2, and transmission takes place at the transmitter band TX2. In an arrangement according to FIG. 10, the distance between the RX and TX bands of the same system is shorter than the distance between the RX and TX bands of two different systems. In the communication arrangement illustrated in FIG. 10, the first and second system can be for example a GSM and a PCN system.

Figure 11:
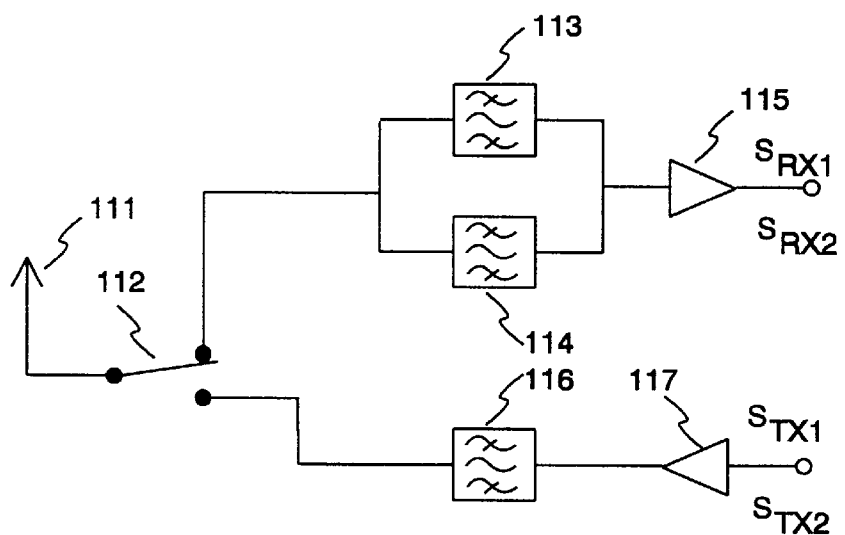
FIG. 11 illustrates an RF front end according to the invention, suited to be used in the communication arrangement of FIG. 10.

FIG. 11 illustrates an RF front end arrangement according to the invention, suited to be used in connection with the communication arrangement of FIG. 10. The signal received by the antenna 111 is there directed by a switch 112 to filters 113 and 114. The pass band of the filter 113 is designed so that the first receiver band RX1 is at the pass band of the filter 113. Respectively, the pass band of the filter 114 is designed so that the second receiver band RX2 is at the pass band of the filter 114. Thus the received signal passes either the filter 113 or the filter 114, depending on whether the reception takes place at the band RX1 or the band RX2. The filtered signal is further directed to an amplifier 115, from the output whereof there are obtained the RX1 band signal $S_{RX1}$ and the RX2 band signal $S_{RX2}$. By means of two parallelly connected filters, a high stop band attenuation is achieved in between the RX1 and RX2 bands. The parallel coupling of the filters requires a matching of the impedances, as was explained in connection with the description of FIG. 3.

In transmission, the TX1 band signal $S_{TX1}$ or the TX2 band signal $S_{TX2}$ is fed into an RF power amplifier 117. The amplified signal is directed to a band pass filter 116, the pass band whereof is designed so that both the band TX1 and the band TX2 are located at the filter pass band. The filtered transmitter signal is further directed, by the switch 112, to the antenna 111. In order to be able to use the same filter for the filtering of both the TX1 and TX2 bands, it is advantageous that the transmitter has a clean spectrum, in which case a high attenuation of the stop band is not needed.

A drawback with solutions where the transmitter signal of the TX or TDD band proceeds unattenuated to the receiver is that another telephone located nearby can cause saturation of the receiver. The raising of the saturation point usually means an increase in the power consumption of the receiver, but in TDD reception the saturation point can be effectively raised without any significant increase in the power consumption, because the receiver is on only momentarily in between the reception time slots.

In context with the description of the preferred embodiments above, it was explained in which mode the switches located in the RF signal path are, depending on the transceiver operation and employed frequency range. Said switches are controlled for instance by a processor included in the mobile station. In the memory of the mobile station, there is stored a control programme whereby the processor creates control signals for the switches.

When the mobile station operates in a time division system, the control programme takes care that the switch is controlled so that during the time slot reserved for transmission, the transmitter signal is directed from the transmitter to the antenna, and during the time slot reserved for reception, the receiver signal is directed from the antenna to the receiver.

When the control programme detects in the mobile communications network a command for switching frequency range, it creates a control signal for the switch and controls the switch as was explained in the description of the preferred embodiment above. The same control signal path can be used for the selection of both reception, transmission and frequency band selection.

If the system allows the mobile station user to choose the employed frequency range, the processor creates a control command for the switch on the basis of a command given from the user interface, for instance from the keyboard.

Arrangements according to the invention can be used in a mobile station operating with two different mobile communications systems at two different frequency bands, and in a mobile station operating at two different frequency bands. The solutions of the invention for creating the frequencies required in the reception can also be used in a paging device of a paging system operating at two different frequency bands, wherefore the invention is not exclusively limited to mobile telephones.

The specification above describes only a few applications of the method according to the invention. The principle of the invention can naturally be modified within the scope of the claims, for instance as for the details of the practical realisation, or the ranges of application.

Particularly communication systems and connected frequency bands are explained by way of example only, and the application of the invention is by no means limited to the described communication systems nor to the described relative locations of the transmitter or receiver bands.

What is claimed is:

1. An apparatus for transmitting and receiving RF signals, the apparatus enabling a transmission to take place at a first transmitter frequency band (TX, TX1) and at a second transmitter frequency band (TDD, TX2), said first and second transmitter frequency bands being separate, so that a reception can take place at a first receiver frequency band (RX, RXI) and at a second receiver frequency band (TDD, RX2), said first and second receiver frequency bands being separate, said apparatus comprising:

filtering means for filtering a signal to be received and transmitted, said filtering means comprising a first, a second, and a third filter means of which at least one of said filter means serves for filtering signals located in at least two different frequency bands;

a first amplifier means for amplifying a first signal and a second signal after reception and filtering, and a second amplifier means for amplifying a third signal and a fourth signal prior to filtering and transmission;

a switch (32) having at least two modes and serving to couple said apparatus to an antenna circuit (38);

wherein said switch (32) is arranged, in a first of the two modes, to couple the antenna circuit (38) to a first connection of the first, and third filter means (33, 36) in order to direct the first signal from the antenna circuit (38) to the first filter means (33) and in order to direct the third and fourth signal from the third filter means (36) to the antenna circuit (38);

a second connection of the first and second filter means (33, 34) is coupled to the input of the first amplifier means (35) in order to direct the first signal from the first filter means (33) to the first amplifier means (35) and in order to direct the second signal from the second filter means (34) to the first amplifier means (35);

said switch means (32) is arranged, in the second mode, to couple the antenna circuit (38) to the second filter means (34) in order to direct the second signal from the antenna circuit (38) to the second filter means (34); and a second connection of said third filter means (36) is coupled to the output of the second amplifier means (37) in order to direct the third and fourth signal from the second amplifier means (37) to the third filter means (36).

2. An apparatus for transmitting and receiving RF signals, the apparatus enabling a transmission to take place at a first transmitter frequency band (TX, TX1) and at a second transmitter frequency band (TDD, TX2), said first and second transmitter frequency bands being separate, so that a reception can take place at a first receiver frequency band (RX, RXI) and at a second receiver frequency band (TDD, RX2), said first and second receiver frequency bands being separate, said apparatus comprising:

filtering means for filtering a signal to be received and transmitted, said filtering means comprising a first, and a second filter means of which at least one of said filter means serves for filtering signals located in at least two different frequency bands;

a first amplifier means for amplifying a first signal and a second signal after reception and filtering, and a second amplifier means for amplifying a third signal and a fourth signal prior to filtering and transmission;

a first connection of the first, and second filter means (42, 44) serving for coupling the apparatus to an antenna circuit (41) in order to direct the first signal from the antenna circuit (41) to the first filter means (42), in order to direct the second signal from the antenna circuit (41) to the second filter means (44), in order to direct the third signal from the second filter means (44) to the antenna circuit (41), and in order to direct the fourth signal from the second filter means (44) to the antenna circuit (41);

a switch (45) having at least two modes, one of said modes serving for connection of said switch to a first connection of the second filter means (44);

wherein said switch (45), in a first of the two modes, is arranged to couple a second connection of the second filter means (44) to the input of the first amplifier means (43) in order to direct the second signal from the second filter means (44) to the first amplifier means (43); and said switch (45) is arranged, in the second of the two modes, to couple a second connection of the second filter means (44) to the output of the second amplifier means (46) in order to direct the third and fourth signal from the second amplifier means (46) to the second filter means (44).

3. An apparatus for transmitting and receiving RF signals, the apparatus enabling a transmission to take place at a first transmitter frequency band (TX, TX1) and at a second transmitter frequency band (TDD, TX2), said first and second transmitter frequency bands being separate, so that a reception can take place at a first receiver frequency band (RX, RXI) and at a second receiver frequency band (TDD, RX2), said first and second receiver frequency bands being separate, said apparatus comprising:

filtering means for filtering a signal to be received and transmitted, said filtering means comprising a first, a second, and a third filter means of which at least one of said filter means serves for filtering signals located in at least two different frequency bands;

a first amplifier means for amplifying a first signal and a second signal after reception and filtering, and a second amplifier means for amplifying a third signal and a fourth signal prior to filtering and transmission;

a switch (62) serving to connect said apparatus to an antenna circuit (61), and having at least two modes;

wherein said switch (62), in a first of the two modes, is arranged to couple the antenna circuit (61) to a first connection of the first and third filter means (63, 66) in order to couple the first and second signals from the antenna circuit (61) to the first filter means (63), and in order to couple the third signal from the third filter means (66) to the antenna circuit;

a second connection of the first filter means (63) is coupled to the input of the first amplifier means (64) in order to direct the first and second signals from the first filter means (63) to the first amplifier means (64);

a second connection of the third filter means (66) is coupled to the output of the second amplifier means (67) in order to direct the third signal from the third amplifier means (67) to the third filter means (66);

said switch (62), in a second of the two modes, is arranged to couple a first connection of the second filter means (65) to the antenna circuit (61) in order to direct the fourth signal from the second filter means (65) to the antenna circuit (61); and a second connection of the second filter means (65) is coupled to the output of the second amplifier means (67) in order to direct the fourth signal from the second amplifier means (67) to the second filter means (65).

4. An apparatus for transmitting and receiving RF signals, the apparatus enabling a transmission to take place at a first transmitter frequency band (TX, TX1) and at a second transmitter frequency band (TDD, TX2), said first and second transmitter frequency bands being separate, so that a reception can take place at a first receiver frequency band (RX, RXI) and at a second receiver frequency band (TDD, RX2), said first and second receiver frequency bands being separate, said apparatus comprising:

filtering means for filtering a signal to be received and transmitted, said filtering means comprising a first, and a second, filter means of which at least one of said filter means serves for filtering signals located in at least two different frequency bands;

a first amplifier means for amplifying a first signal and a second signal after reception and filtering, and a second amplifier means for amplifying a third signal and a fourth signal prior to filtering and transmission;

a first connection of said first, and second filter means (72, 75) serving for coupling the apparatus to an antenna circuit (71);

wherein a second connection of the second filter means (75) is coupled to the output of the second amplifier means (76) in order to filter the third signal and feed it to the antenna circuit (71);

the apparatus further comprises a switch (73), coupled to a second connection of the first filter means and the second connection of the second filter means and having at least two modes;

said switch, in a first of the two modes, is arranged to couple the second connection of the first filter means to the first amplifier means (74) in order to direct the first and second signals from the first filter means (72) to the first amplifier means (74); and said switch (73), in a second of the two modes, is arranged to couple the output of the second amplifier means (76) to the second connection of the first filter means (72) in order to direct the fourth signal to the antenna circuit (71) via the first filter means (72).

5. An apparatus for transmitting and receiving RF signals, the apparatus enabling a transmission to take place at a first transmitter frequency band (TX, TX1) and at a second transmitter frequency band (TDD, TX2), said first and second transmitter frequency bands being separate, so that a reception can take place at a first receiver frequency band (RX, RXI) and at a second receiver frequency band (TDD, RX2), said first and second receiver frequency bands being separate, said apparatus comprising:

filtering means for filtering a signal to be received and transmitted, said filtering means comprising a first, and a second filter means of which at least one of said filter means serves for filtering signals located in at least two different frequency bands;

a first amplifier means for amplifying a first signal and a second signal after reception and filtering, and a second amplifier means for amplifying a third signal and a fourth signal prior to filtering and transmission;

a switch (92) having at least two modes, and serving for coupling the apparatus to an antenna circuit (91);

wherein, in a first of the two modes said switch (92) is arranged to couple the antenna circuit (91) to a first connection of the first filter means (93) in order to direct the first and second signals from the antenna circuit (91) to the first filter means (93);

a second connection of the first filter means (93) is coupled to the input of the first amplifier means (94) in order to direct the first and second signals from the first filter means (93) to the first amplifier means (94);

in the second of the two modes, said switch (92) is arranged to switch a first connection of the second filter means (95) to the antenna circuit (91), and to direct the third and fourth signals from the second filter means (95) to the antenna circuit (91); and a second connection of the second filter means (95) is coupled to the output of the second amplifier means (96) in order to direct the third and fourth signals from the second amplifier means (96) to the second filter means (95).

6. An apparatus for transmitting and receiving RF signals, the apparatus enabling a transmission to take place at a first transmitter frequency band (TX, TX1) and at a second transmitter frequency band (TDD, TX2), said first and second transmitter frequency bands being separate, so that a reception can take place at a first receiver frequency band (RX, RXI) and at a second receiver frequency band (TDD, RX2), said first and second receiver frequency bands being separate, said apparatus comprising:

filtering means for filtering a signal to be received and transmitted, said filtering means comprising a first, a second, and a third filter means of which at least one of said filter means serves for filtering signals located in at least two different frequency bands;

a first amplifier means for amplifying a first signal and a second signal after reception and filtering, and a second amplifier means for amplifying a third signal and a fourth signal prior to filtering and transmission;

a switch (112), having at least two modes, and serving to couple the apparatus to an antenna circuit (111);

wherein, in a first of the two modes said switch (112) serves for coupling the antenna circuit (111) to a first connection of the first and second filter means (113, 114) in order to direct the first signal from the antenna circuit (111) to the first filter means (113), and in order to direct the second signal from the antenna circuit (111) to the second filter means (114);

a second connection of the first and second filter means (113, 114) is coupled to the input of the first amplifier means (115) in order to direct the first signal from the first filter means (113) to the first amplifier means (115), and in order to direct the second signal from the second filter means (114) to the first amplifier means (115);

in the second of the two modes, said switch (112) is arranged to switch the antenna circuit (111) to a first connection of the third filter means (116) in order to direct the third and fourth signals from the third filter means (116) to the antenna circuit (111); and an output of the second amplifier means (117) is coupled to a second connection of the third filter means (116) in order to direct the third and fourth signals from the second amplifier means (117) to the third filter means (116).

7. Use of an arrangement according to claim 1 in a communication arrangement, wherein the second transmitter frequency band (TDD) and the second receiver frequency band (TDD) are at least partly overlapping, and the distance of the first transmitter frequency band (TX) from the second transmitter frequency band (TDD) and from the second receiver frequency band (TDD) is shorter than from the first receiver frequency band (RX).

8. Use of an arrangement according to claim 3 in a communication arrangement, wherein the second transmitter frequency band (TDD) and the second receiver frequency band (TDD) are at least partly overlapping, and the distance of the first receiver frequency band (RX) from the second transmitter frequency band (TDD) and from the second receiver frequency band (TDD) is shorter than the distance from the first transmitter frequency band (TX).

9. Use of an arrangement according to claim 5 in a communication arrangement, wherein the second transmitter frequency band (TDD) and the second receiver frequency band (TDD) are at least partly overlapping, and the distance of the first receiver frequency band (RX) from the first transmitter frequency band (TX) is shorter than the distance from the second receiver frequency band (TDD) and from the second transmitter frequency band (TDD).

10. Use of an arrangement according to claim 6 in a communication arrangement, wherein the first transmitter frequency band (TX1), the second transmitter frequency band (TX2), the first receiver frequency band (RX1) and the second receiver frequency band (RX2) are separate from each other, and the distance between the first transmitter frequency band (TX1) and the first receiver frequency band (RX1) as well as the distance between the second transmitter frequency band (TX2) and the second receiver frequency band (RX2) are shorter then the distance of the first transmitter frequency band (TX1) and the first receiver frequency band (RX1) from the second transmitter frequency band (TX2) and the second receiver frequency band (RX2).

11. Apparatus, adapted for connection to an antenna, for transmitting and receiving RF signals, the apparatus enabling a transmission to take place at a first transmitter frequency band and at a second transmitter frequency band, said first and second transmitter frequency bands being separate, so that a reception can take place at a first receiver frequency band and at a second receiver frequency band, said first and second receiver frequency bands being separate, said apparatus comprising:

filtering means for filtering a signal to be received and transmitted, said filtering means comprising a first, a second, a third, and a fourth filter of which at least one of said filters serves for filtering signals located in at least two different frequency bands;

a first amplifier for amplifying a first signal and a second signal after reception and filtering, and a second amplifier for amplifying a third signal and a fourth signal prior to filtering and transmission, wherein each of said filters has a first connection point for coupling to the antenna and a second connection point for coupling with at least one of said first and said second amplifiers and, wherein, in each of said filters, the first connection point is different from the second connection point;

a switch having at least two modes and serving to couple said apparatus to the antenna circuit;

wherein at least two of said filters, but not more than three of said filters, are essentially one and the same filter;

said switch is operative, in a first of the two modes, to couple the antenna circuit to a first set of said filters and, in a second of the two modes, to couple the antenna circuit to a second set of said filters, wherein, said first and said second filter sets collectively include all of said filters and, individually, each of said filter sets comprises at least one of said filters but not more than three of said filters; and said first amplifier is connected to said first filter set, and said second amplifier is connected to said second filter set to enable communication of said first and said second signals via respective ones of said first and said second filters with said antenna circuit dependent on the first mode of said switch, and to enable communication of said third and said fourth signals via respective ones of said third and said fourth filters with said antenna circuit dependent on the second mode of said switch.

12. Apparatus, adapted for connection to an antenna, for transmitting and receiving RF signals, the apparatus enabling a transmission to take place at a first transmitter frequency band and at a second transmitter frequency band, said first and second transmitter frequency bands being separate, so that a reception can take place at a first receiver frequency band and at a second receiver frequency band, said first and second receiver frequency bands being separate, said apparatus comprising:

filtering means for filtering a signal to be received and transmitted, said filtering means comprising a first, a second, a third, and a fourth filter of which at least one of said filters serves for filtering signals located in at least two different frequency bands;

a first amplifier for amplifying a first signal and a second signal after reception and filtering, and a second amplifier for amplifying a third signal and a fourth signal prior to filtering and transmission, wherein each of said filters has a first connection point for coupling to the antenna and a second connection point for coupling with at least one of said first and said second amplifiers and, wherein, in each of said filters, the first connection point is different from the second connection point;

a switch having at least two modes and serving to couple said filtering means, via the second connection points in respective ones of said filters, to said first and said second amplifiers;

wherein at least two of said filters, but not more than three of said filters, are essentially one and the same filter;

upon connection of the antenna circuit to said filtering means via the first connection points in respective ones of said filters, said switch is operative, in a first of the two modes, to couple said first amplifier to a first set of said filters and, in a second of the two modes, to couple said second amplifier to a second set of said filters, wherein, said first and said second filter sets collectively include all of said filters and, individually, each of said filter sets comprises at least one of said filters but not more than three of said filters; and connection of said first amplifier to said first filter set, and connection of said second amplifier to said second filter set enables communication of said first and said second signals via respective ones of said first and said second filters with said antenna circuit dependent on the first mode of said switch, and enables communication of said third and said fourth signals via respective ones of said third and said fourth filters with said antenna circuit dependent on the second mode of said switch.

* * * * *